United States Patent [19]
Nestorovic

[11] 3,783,379
[45] Jan. 1, 1974

[54] FULL WAVE PEAK RESPOND METER

[75] Inventor: Mioljub R. Nestorovic, Endwell, N.Y.

[73] Assignee: McIntosh Laboratory, Inc., Binghamton, N.Y.

[22] Filed: Mar. 8, 1971

[21] Appl. No.: 122,010

[52] U.S. Cl. .............. 324/103 P, 324/119, 324/125
[51] Int. Cl. ...................... G01r 19/16, G01r 19/22
[58] Field of Search ................ 324/103, 103 P, 102, 324/125, 123, 118; 329/204; 328/26

[56] References Cited
UNITED STATES PATENTS

| | | | |
|---|---|---|---|
| 3,183,435 | 5/1965 | Donville et al. | 328/26 |
| 3,621,404 | 11/1971 | Sjogren | 324/119 |
| 3,492,575 | 1/1970 | Campbell | 324/125 |
| 2,972,677 | 2/1961 | Meadows | 329/204 |
| 2,678,387 | 5/1954 | Volz | 328/26 |
| 2,999,155 | 9/1961 | Masonson | 329/204 |

Primary Examiner—Rudolph V. Rolinec
Assistant Examiner—Ernest F. Karlsen
Attorney—Hurvitz & Rose

[57] ABSTRACT

A peak voltage detector responsive to a wide band AC signal, which detects both the negative and positive peaks of the signal, indicating which is the larger. The signal is applied to a transistor amplifier, and outputs are taken from equal collector and emitter loads through capacitors and diodes to a common high resistance load and a sustain timing capacitor in parallel to the load. The voltage across the latter is applied to the base of an emitter loaded Darlington amplifier. The emitter load includes a meter in series with a second time constant circuit. The function of the second time constant circuit is to accelerate upward deflection of the meter. The function of the first time constant circuit is to hold a charge long enough to maintain the meter reading for a time after the peak pulse has passed.

6 Claims, 1 Drawing Figure

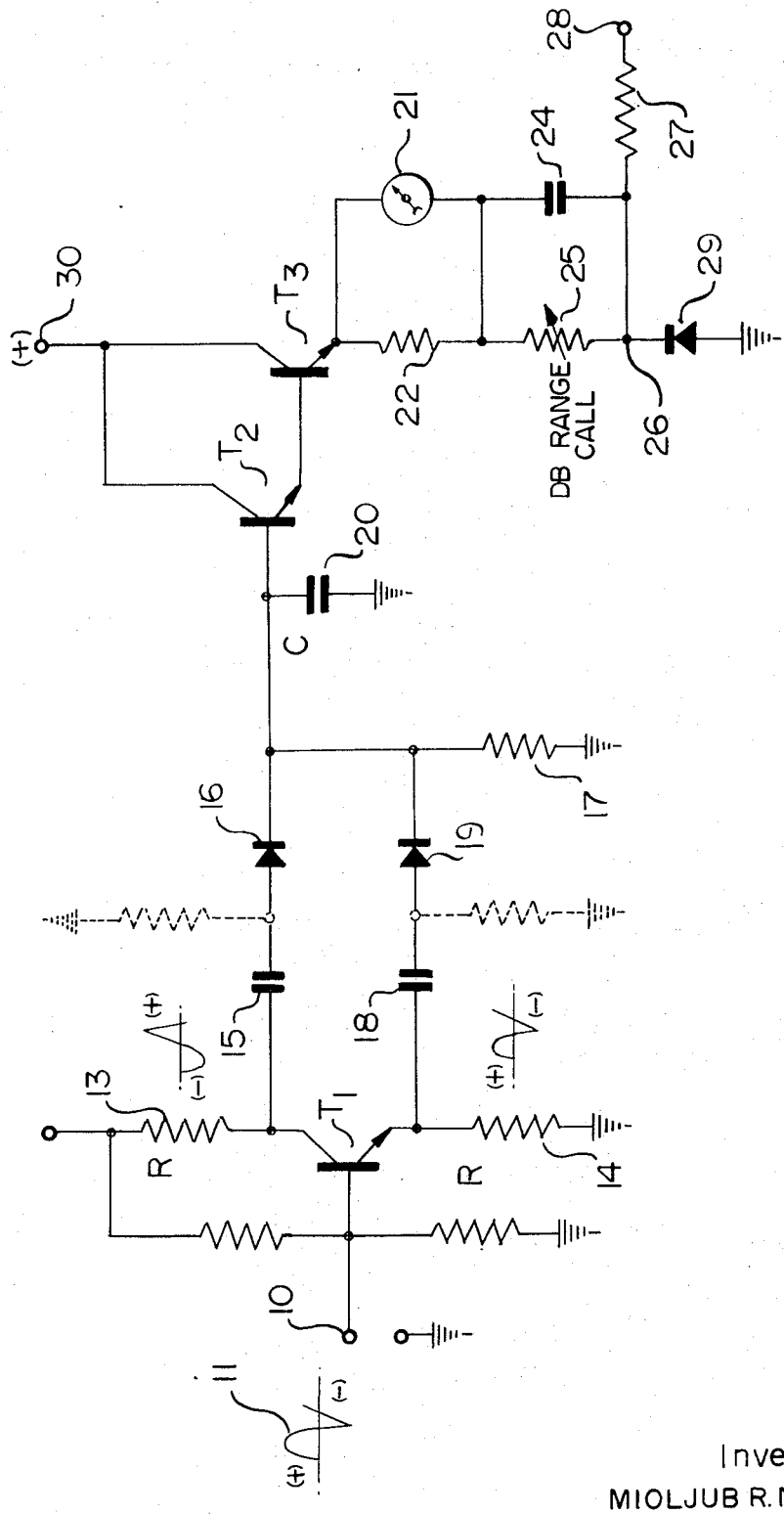

FULL WAVE PEAK RESPOND METER

CROSS REFERENCE

This application is a continuation-in-part of application Ser. No. 832,617 filed June 12, 1969, now abandoned in the name of Mioljub R, Nestorovic, entitled Full Wave Peak Respond Meter.

BACKGROUND OF THE INVENTION

Peak reading voltmeters are sometimes utilized in amplifier circuits for monitoring peak output level. For such use the voltmeter must respond to and measure peaks which may occur transiently as parts of a complex audio signal, and requires accelerated displacement of a meter pointer when a peak occurs. It is known to improve the response of a DC meter by directing the initial meter current into a capacitor, which presents an initial effective short circuit to transient increase of current and thus transiently provides high current flow to the meter. This approach is taught in U. S. Pat. No. 2,356,617 to Rich. A peak reading voltmeter with accelerated response is taught in application for U. S. Pat. Ser. No. 662,240, filed July 13, 1967, in the name of David L. Campbell, which is assigned to the assignee of the present application.

The Campbell circuit is one sided, i. e., responds to positive peaks and ignores negative peaks. This has been found inadequate for some purposes, and the present invention constitutes an improvement on Campbell in part in that the higher of positive or negative peaks which may occur within a limited time interval is selected for indication by a DC meter, and in part in respect to the circuitry of the meter.

SUMMARY OF THE INVENTION

A peak reading voltmeter which reads either negative or positive peaks of a complex AC wave, whichever is greater, and having provision for rapidly increasing meter reading to respond accurately to an increase of peak signal, but only slowly decreasing the meter reading.

BRIEF DESCRIPTION OF THE DRAWING

The single FIGURE of the drawing is a schematic circuit diagram of a bilateral peak reading voltmeter circuit according to the invention.

DESCRIPTION OF THE PREFERRED EMBODIMENT

A signal input terminal 10 has applied thereto a complex AC signal which is or may be asymmetrical, having either a larger negative peak than it has a positive peak, or vice versa. A typical wave form is illustrated at 11 and contains a large negative peak and a smaller positive peak. The signal appearing at terminal 10 is applied to the base of an NPN transistor $T_1$, having equal collector and emitter loads 13, 14. the collector is connected via coupling capacitor 15 and diode 16 to a load 17. The emitter is connected via a coupling capacitor 18 which duplicates capacitor 15, and a diode 19 to load 17.

The coupling capacitors block DC, so that only time varying signals appear across resistance 17. If a positively going signal appears at the base of $T_1$, the emitter of $T_1$ rises in voltage and passes a rising current to resistance 17. At this time the voltage at the collector of $T_1$ is falling, and diode 16 blocks it. If a negatively going signal appears at the base of $T_1$, the voltage at the collector rises and that at the emitter drops. Again a positive voltage appears across resistance 17. The positive voltage across resistance 17 is not fed back to the transistor $T_1$, because diodes 16, 18 provide isolation.

Variations of voltage appearing across resistance 17 are passed to the base of transistor pair $T_2$, $T_3$ connected in a compound emitter follower configuration. A timing capacitor 20 is connected from the base of $T_2$ to ground. $T_3$ has a collector directly connected to a source of positive voltage, and has an emitter load. The emitter load includes a DC milliammeter 21, connected in parallel with a shunt resistance 22, which is connected in series with parallel combination capacitor 24 and a db range calibration resistance 25 to a junction point 26. Point 26 is connected via a current limiting resistance 27 to a point of negative voltage 28, and via a diode 29 to ground. The anode of the diode is grounded. It follows that point 26 will be maintained negative with respect to ground by about 0.6V. This will make transistors $T_2$ and $T_3$ slightly conductive but not enough to produce noticeable meter deflection.

If now a sufficient positive voltage is applied transiently to the base of $T_2$, $T_3$ passes current proportional to the voltage. This current flows as a transient through the meter and through capacitor 24, which is essentially a short circuit to a transient. Current through the meter is then limited by series resistance 27, and if this is relatively small, the current in the meter rapidly attains a value much larger than its steady state value for that signal would have been, so that a ballistic impulse is delivered to the meter. The meter itself is a milliammeter and has low impedance. The ballistic impulse may be sufficient, has it been steady, to produce ten times full scale deflection, but as soon as capacitor 24 is charged, it no longer conducts and current continues to flow via the meter 21, resistance 25 and resistance 27. This path limits meter current to its normal steady state value. The action of the capacitor 24 is, then, to accelerate the meter reading towards its final value.

When the transient peak of input signal terminates, the capacitor 24 being charged, tends to discharge in the path containing resistance 25. This is not a particularly long time constant circuit, and moreover the direction of discharge of capacitor 24 is not such as to maintain meter 21 in its deflected condition. The latter function is accomplished by the sustain timing capacitor 20, one side of which is connected to the cathodes of diodes 16, 19 and the base of $T_2$, and the other side of which is grounded. The base-emitter junction of $T_2$ provides a conductive diode when the voltage across resistance 17 or across capacitor 20, rises. Capacitor 20 can acquire a charge rapidly. When the source of voltage disappears, however, capacitor 20 can only discharge through resistance 17, and into the base of $T_2$. Accordingly, capacitor 20 can acquire an increase of charge rapidly, but thereafter can lose its charge only slowly and thus sustains the conductivity of $T_2$, $T_3$.

An incoming pulse, with power furnished through transistors $T_2$, $T_3$ drives meter 21 upscale rapidly, and then leaves a bound charge on capacitor 20 which represents the peak of the pulse and tends to maintain $T_2$, $T_3$ conductive, and meter 21 with a correct reading for that peak value.

In operation in an amplifier circuit, an audio signal source is connected to terminal 10. It is assumed that the signal is susceptible to rapid variations in peak voltage, which may attain values many db above average signal level. It is these peaks which may overdrive the amplifier, or cause damage to loudspeakers. The meter circuit of the invention records the presence of such peaks for a time after they occur, and indicates the desirability of reducing amplifier gain.

I claim:

1. A peak voltmeter for an asymmetrical complex audio wave having alternative peak values of opposite polarities which may be unequal, comprising
   a first transistor having a base, an emitter, and a collector,
   equal resistive emitter and collector loads for said first transistor,
   means applying said wave to said base,
   a resistive load circuit,
   means comprising a first capacitor and a first diode, in series connected between said emitter and said load, said first diode having its anode coupled to said emitter,
   means comprising a second capacitor and a second diode in series connected between said collector and said load, said second diode having its anode coupled to said collector, whereby said load carries a voltage having the peak value of said audio wave regardless of polarity of said peak value of said audio wave,
   a second transistor having a base, an emitter and a collector, and
   a storage capacitor connected across said load and to said base of said second transistor, said storage capacitor having a relatively low impedance charging path through said diodes and having a relatively high impedance discharge path including said resistive load circuit, said storage capacitor and said relatively high impedance discharge path being adequately long to store a voltage corresponding with the higher of said peak values only,
   wherein said meter circuit includes a meter and a capacitor further connected in series between said emitter of said second transistor and a point of reference potential, said further capacitor having sufficient capacity to permit transient flow of current to said meter on increase of current through said second transistor sufficient to drive said meter off-scale if applied steady state, and diode bias means normally maintaining said second transistor at the edge of conduction.

2. A peak voltmeter for indicating the input peak value regardless of polarity of a complex alternating current audio frequency signal, wherein said peak values may be of opposite polarities and of unequal emplitudes, comprising means responsive to said complex signal for generating a voltage having a reference peak value of only one polarity regardless of the polarities of the input peak values and functionally related in amplitude to the peak amplitudes of only the larger of said input peak values, regardless of the polarity of said larger of said input peak values, a storage capacitor, a transistor circuit having a control electrode and an output electrode, means applying said voltage commonly to said control electrode and across said storage capacitor, a meter responsive to current flow from said output electrode of said transistor circuit, and means biassing said transistor circuit at the edge of current flow from said output electrode, wherein said meter is connected to be responsive to current in an emitter circuit of said transistor circuit, and diode means biassing said transistor circuit at the edge of conduction, wherein said meter has a meter movement and is connected in series with a large acceleration capacitor having a capacitance selected to provide a ballistic impulse to said meter movement during increase of current through said meter movement, wherein said first mentioned means is a full wave rectifier, wherein said full wave rectifier includes a further transistor having a base, an emitter and a collector, equal resistive loads connected in the emitter and collector circuits of said further transistor, equal dc isolating capacitors having one a terminal connected to said collector and the other a terminal connected to said emitter of said further transistor, and a common load including said storage capacitor across which full wave rectified voltage is developed connected as a load for said full wave rectifier, and wherein said full wave rectifier further comprises two diodes connected respectively between said dc isolating capacitors and said storage capacitor.

3. A peak voltmeter, comprising
   a source of ac voltage having randomly occurring positive an negative peaks which may be unequal in peak values,
   a first transistor having a base, an emitter and a collector,
   means connecting said source to said base,
   a resistire collector load for said first transistor,
   a resistive emitter load for said first transistor,
   said collector and emitter loads being equal,
   a common load resistance,
   means comprising a first capacitor and a first diode in series for passing signal from said collector to said common load resistance,
   means comprising a second capacitor and a second diode for passing signal from said emitter to said common load,
   a peak voltage meter circuit responsive to voltage across said common resistance for indicating the value of the peak voltage across said common resistance, said peak voltage meter circuit including a further transistor having a base, a timing sustain capacitor connected across said common load resistance, and to said base, and a meter connected in series with said further transistor.

4. In a peak reading voltmeter, a storage capacitor, a fast charge circuit for charging said storage capacitor positively as a function of a peak of an audio signal regardless of polarity of that audio signal, a Darlington amplifier having an input base and an output emitter, means connecting said storage capacitor between said input base and ground, a milliammeter, an accelerating capacitor, a current limiting resistance, a negative voltage terminal, means connecting said milliammeter, said accelerating capacitor and said current limiting resistance between said emitter and said negative voltage terminal in the order recited, a diode having its cathode directly connected between the junction of said accelerating capacitor and said current limiting resistance and its anode directly connected to ground, a range calibration resistance connected across said accelerating capacitor, a resistive path shunting said accelerating capacitor to provide an alternative current path for current around said milliammeter, and a long time constant discharge resistance connected across said storage capacitor, said range calibration resistance having a value selected to provide a short time constant discharge path for said accelerating capacitor.

5. A peak voltmeter, comprising a source of audio voltage having randomly occurring positive and negative peaks which may be unequal in peak values, a full wave rectifier having a load resistance across which is developed a rectified replica of said audio voltage, a storage capacitor connected across said load resistance, said storage capacitor and load resistance having a time constant sufficiently long to store a voltage proportional to only the higher of said peaks, a peak voltage meter circuit responsive to voltage across said capacitor for indicating the value of the peak voltage across said capacitor, said peak voltage circuit including a further transistor circuit having a base connected to said capacitor and having an emitter output electrode, and a meter connected in series between said emitter output electrode and ground, wherein is provided a diode bias circuit connected to said emitter output electrode and providing bias for said further transistor circuit maintaining said transistor bias circuit at the edge of conduction of current from said output electrode, wherein aid peak voltage meter circuit includes a meter connected in series with said emitter output electrode, a meter accelerating capacitor connected between said meter and a point of reference potential, and a range calibrating resistance shunting said meter accelerating capacitor.

6. In a peak reading voltmeter, a storage capacitor, a fast charge circuit for charging said storage capacitor positively as a function of the peak of an audio signal regardless of polarity of that audio signal, an amplifier having an input base and an output emitter, means connecting said storage capacitor between said input base and ground, a milliammeter, an accelerating capacitor, a current limiting resistance, a negative voltage terminal, means connecting said milliammeter, said accelerating capacitor and said current limiting resistance betweeen said emitter and said negative voltage terminal in the order recited, a diode having its cathode directly connected between the junction of said accelerating capacitor and said current limiting resistance and its anode directly connected to ground, a range calibration resistance connected across said accelerating capacitor, a resistive path shunting said accelerating capacitor to provide an alternative current path for current around said milliammeter, and a long time constant discharge resistance connected across said storage capacitor, said range calibration resistance having a value selected to provide a short time constant discharge path for said accelerating capacitor.

* * * * *